US008350672B2

(12) United States Patent
Münzebrock

(10) Patent No.: US 8,350,672 B2
(45) Date of Patent: Jan. 8, 2013

(54) METHOD AND SYSTEM FOR WIRELESSLY TRANSMITTING CONTROL COMMANDS FOR A CONTROLLER FOR LIFTING GEAR

(75) Inventor: Anton Münzebrock, Dortmund (DE)

(73) Assignee: Demag Cranes & Components GmbH, Wetter (DE)

( * ) Notice: Subject to any disclaimer, the term of this patent is extended or adjusted under 35 U.S.C. 154(b) by 1161 days.

(21) Appl. No.: 12/281,695

(22) PCT Filed: Mar. 15, 2007

(86) PCT No.: PCT/EP2007/052452

§ 371 (c)(1), (2), (4) Date: Sep. 4, 2008

(87) PCT Pub. No.: WO2007/107496

PCT Pub. Date: Sep. 27, 2007

(65) Prior Publication Data

US 2009/0009358 A1 Jan. 8, 2009

(30) Foreign Application Priority Data

Mar. 18, 2006 (DE) ........................ 10 2006 012 471

(51) Int. Cl.
*H02J 13/00* (2006.01)

(52) U.S. Cl. ...................... 340/9.1; 340/5.61; 340/12.22

(58) Field of Classification Search ................... 340/9.1, 340/12.22, 5.71; 307/328; 212/285
See application file for complete search history.

(56) References Cited

U.S. PATENT DOCUMENTS 4,456,132 A * 6/1984 LaValle et al. ................ 212/285
4,621,375 A * 11/1986 Simnovec ..................... 398/110
5,506,905 A * 4/1996 Markowski et al. .......... 380/262
5,661,804 A * 8/1997 Dykema et al. ............... 380/274
6,995,682 B1 * 2/2006 Chen et al. ................. 340/12.22
2003/0210154 A1 11/2003 Bredow et al.
2007/0052548 A1 * 3/2007 Hankin et al. ........... 340/825.69

FOREIGN PATENT DOCUMENTS

DE 42 40 291 A1 6/1994
EP 1 343 128 A2 9/2003

OTHER PUBLICATIONS

English translation of International Preliminary Report on Patentability for corresponding PCT Application No. PCT/EP2007/052452 mailed on Dec. 10, 2008.
International Search Report (Form PCT/ISA/210) and Written Opinion of the International Searching Authority (Form PCT/ISA/237) from corresponding Patent Cooperation Treaty (PCT) Application No. PCT/EP2007/052452 mailed Jun. 29, 2007.
Machine translation of German Patent No. 42 40 291.

* cited by examiner

*Primary Examiner* — Daniel Wu
*Assistant Examiner* — Frederick Ott
(74) *Attorney, Agent, or Firm* — Gardner, Linn, Burkhart & Flory, LLP

(57) ABSTRACT

Method for wirelessly transmitting control commands for a controller for lifting gear, wherein a wireless operating part has an unmistakeable address and a receiving part of the lifting gear has a selectable identifier, wherein the operating part is unambiguously assigned to a receiving part of lifting gear, said method comprising the following steps for assigning the operating part to the receiving part: (i) an address feature is formed from the address of the operating part and the identifier of the receiving part; (ii) the address feature is emitted in an allocation message; (iii) the emitted allocation message is received in the receiving part and (iv) the operating part is allocated to the receiving part, if the receiving part has not been allocated, by storing the address feature as a valid address feature in the receiving part, and corresponding system.

18 Claims, 2 Drawing Sheets

METHOD AND SYSTEM FOR WIRELESSLY TRANSMITTING CONTROL COMMANDS FOR A CONTROLLER FOR LIFTING GEAR

CROSS-REFERENCE TO RELATED APPLICATIONS

This application is a national stage application of international application PCT/EP2007/052452, filed Mar. 15, 2007. This application also claims priority to German application 10 2006 012 471.5, filed Mar. 18, 2006. The complete disclosures of both the German and international applications are incorporated herein by reference.

BACKGROUND OF THE INVENTION

The invention concerns a method for wirelessly transmitting control commands to a controller for lifting gear, wherein a wireless operating part has a permanently imprinted unmistakeable address and a receiving part of the lifting gear has a selectable identifier, wherein the operating part is unambiguously assigned to a receiving part of the lifting gear.

Usually in the field of crane technology one makes use of operator switches, by which the operator controls the movements of the crane. These operator switches or operator elements have, for example, corresponding buttons for "lift/lower" movements of the load and possibly other buttons for the travel of the crane, such as the movement of a trolley.

Systems for the wireless transmitting of control commands are used for the control of machines by an operator when the position of the operator with respect to the controlled machine must be able to change. This can result from reasons of ergonomics or working safety or position-changing mobility of the machine. Wireless transmission in these applications has the advantage over wire-bound transmission in that the freedom of movement of the operator is not limited by the reach of cables or by permanently installed operator consoles.

On the other hand, however, with wire-bound transmission between the operating part and the machine controller, the assignment is always unambiguous thanks to the material connection between the two units and the operator can easily understand it, if properly configured.

This clarity does not exist with wireless transmission of control commands.

In order to also achieve this clarity of assignment between operating part and receiving part and the machine controller connected thereto in the case of wireless transmission, it is known how to add additional unambiguous address features to the control commands during the transmission, which are used in the receiving part so that only those commands are executed that contain the address feature of the respective operating part.

Since the range of modern wireless transmission systems can exceed the visual range or the region of enclosed spaces, and because of the unrestricted place of operation of the transmission systems or the presence of several pieces of gear in the receiving range, special precautions need to be in place to ensure that the clarity of assignment between an operating part and the receiving part is at hand, and that this is also protected against manipulations.

This is accomplished in the prior art in that the corresponding units, operating part or receiving part, are each provided by the manufacturer with a permanently imprinted, unambiguous and unmistakeable address. When the transmission system is in operation, the unambiguous imprinted address is permanently transmitted to the corresponding unit or interchanged with one another.

Wireless transmission systems of the described prior art have the drawback that, when one of the units with the imprinted unambiguous address fails, the system has to be set up with the new address of the replacement device, which entails the expense of placing the system in operation once again.

Since the operating part and receiving part are in principle separated by space and in many instances the receiving part is difficult to reach, such as in crane systems, the down time and expense are considerable when it is necessary to open the receiving part to change the permanently imprinted, unambiguous and unmistakeable address. In application cases where the malfunction or loss of the operating unit cannot be tolerated, a replacement operating unit with the same address is manufactured. But this requires special security measures by the operator of the system to rule out risks of a deliberate or accidental use of the two operating parts in parallel.

If the transmitting and receiving parts are provided with separate addresses that are interchanged when the equipment is placed in operation, both the operating part and the receiving part must have a transmitting and receiving unit, which increases the costs of their manufacture. Also, the administering of the unambiguous unmistakeable addresses of the operating parts and receiving parts is cumbersome.

SUMMARY OF THE INVENTION

In one embodiment, the invention reduces the expense for the unambiguous assignment of an operating part and a receiving part of a wireless transmission system and makes possible the availability of replacement operating units without security risks. Furthermore, it allows one to quickly place an operating part or a replacement unit in service with little expense. Moreover, the layout of the system is simplified and made at less cost, and the cost of administering the unambiguous addresses is lowered.

According to one aspect of the present invention, a method of wireless communication between a remote control and a receiving part of a machine controller is provided. The remote control includes a unique address and the receiving part of the machine controller includes an identifier. The method includes transmitting an allocation message from the remote control to the receiving part wherein the allocation message including the unique address of the remote control, the identifier of the receiving part of the machine controller, and information identifying the allocation message as an allocation message. The allocation message is received at the receiving part where it is determined whether the receiving part is in an allocated state or a non-allocated state. If the receiving part is in the allocated state, the allocation message is ignored. If the receiving part is in the non-allocated state, the receiving part is set to an allocated state and the unique address is stored at the receiving part whereby the receiving part thereafter controls the machine controller in response to control commands transmitted from the remote control that include the unique address and the identifier for the receiving part of the machine controller, and whereby the receiving part does not control the machine controller in response to control commands transmitted from a different remote control that includes an address different from the unique address.

According to another aspect of the present invention, a wireless communication system is provided. The wireless communication system includes a remote control and a receiving part. The remote control includes a unique address and is adapted to transmit allocation messages and control messages. The receiving part includes an identifier and is adapted to receive the allocation messages and control messages from the remote control. The receiving part is capable of assuming an allocated and a non-allocated state. The allocation messages include the unique address, the identifier, and information identifying the allocation messages as allocation messages. The receiving part switches from the non-allocated state to the allocated state upon receipt of the allocation message, and the receiving part passes the control message onto the machine controller upon receipt of the control message.

According to other aspects of the present invention, a signal unit may be provided that emits an audio or visual signal upon the successful allocation of a receiving part and remote control. The receiving part may also control the power supply to the machine controller. The receiving part further may store the unique address in a memory in order to verify whether future messages are intended for that particular receiving part.

DETAILED DESCRIPTION OF THE EMBODIMENTS

Figure 1:
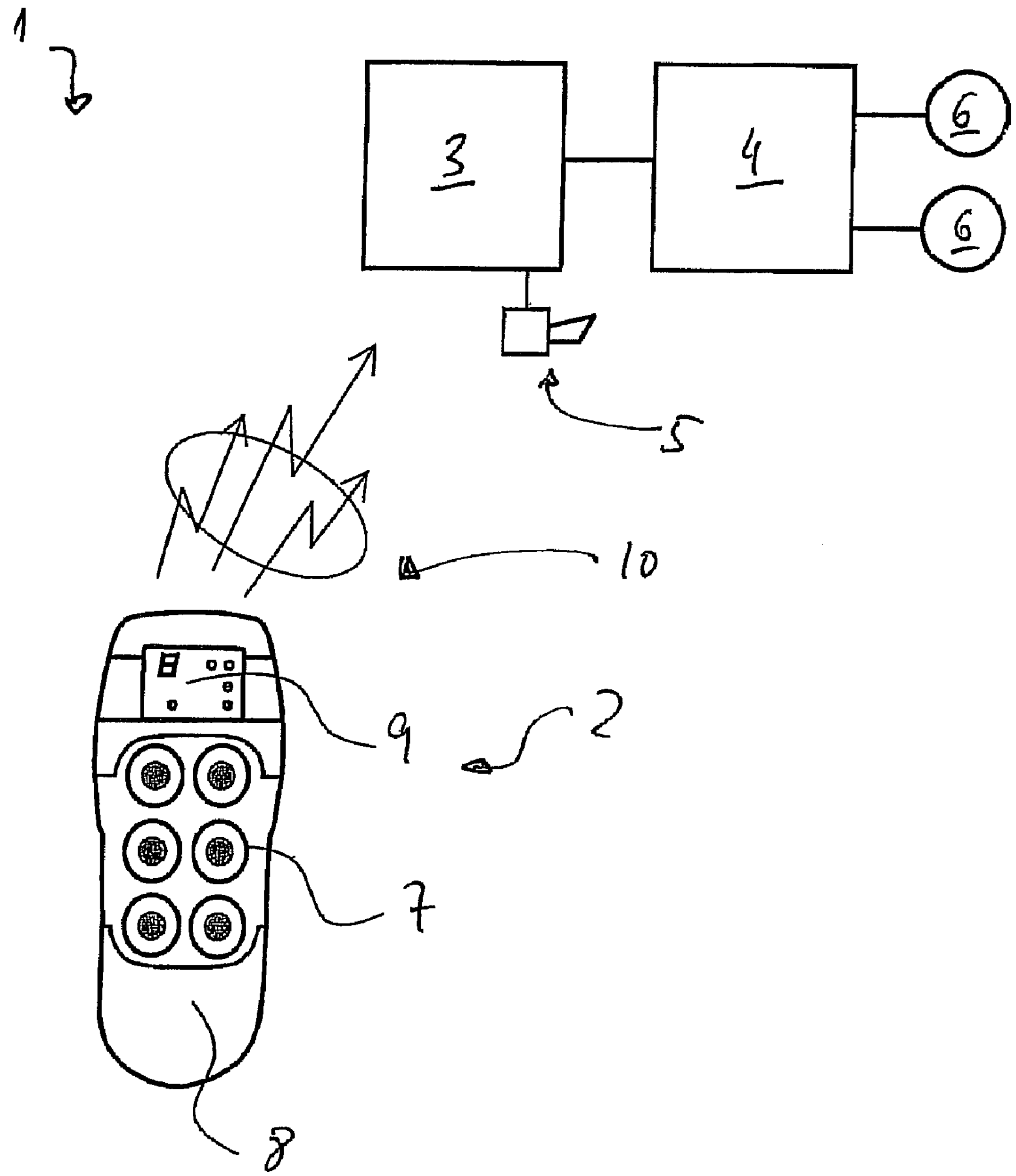
FIG. 1 is a schematic diagram of a system made up of an operating part and a receiving part.

The system in the present case, designated overall as 1, comprises an operating part or remote control 2 and a receiving part 3, being a manual controller for a cable or chain hoisting gear, which can travel, e.g., by means of a trolley.

The receiving part 3 is connected to a machine controller 4 in such a way that the latter receives the commands to be carried out for the movement of the hoisting mechanism and the trolley from the receiving part 3 and at the same time provides power to the electrical drive units 6, which are connected to it.

At the receiving part 3, moreover, a signal unit 5 is arranged, serving to acknowledge the successful allocation of an operating part 2. In the present case, the signal unit 5 puts out an acoustical signal. The signal can consist of a series of tones allowing one to infer that the operating part 2 has been allocated. Furthermore, the signal unit 5 can also put out additional signals, e.g., indicating the resetting or the failed allocation.

The operating part 2 is a wireless manual device with command unit 7, i.e., multilevel keys for the movement of the hoisting gear and/or the trolley, with a battery compartment 8 to provide energy and with a display 9 to show the crane number allocated as the identifier of the receiving part or the operating status at the moment.

The signals 10 can be radio or IR signals.

In order to allocate the operating part 2 to the receiving part 3, the following steps are carried out, wherein the receiving part 3 is in the nonallocated condition, i.e., it has an identifier "00".

At first, the operating part 2 emits its unique or unmistakeable address, and this address is coupled with a generally valid identifier of a receiving part 3, which is selected or entered by the operator. This is triggered by a suitable keying combination of the buttons 7, and it is provided that unintentional activation of the allocation procedure is unlikely. Next, the transmission unit sends out an allocation message as the signal 10, which contains an address feature. The allocation message contains a special header, from which the receiving part 3 learns that it involves a message for the allocation.

The address of the operating part 2 becomes a valid address feature for the transmission of control commands in that it is amplified by an additional identifier that is assigned by the operator to distinguish the receiving part 3 or crane. The entering of the additional identifier takes place during the allocation procedure, which can be carried out with the operating part 2. In the present case, the valid identifiers lie between "01" and By the allocation procedure, the identifier is stored in the operating part 2 and transmitted to the not yet allocated receiving part 3, which stores the combination of imprinted address of the operating part 2 and additional identifier as a valid address feature for the reception of control commands.

This message is received by the receiving part 3. Here, an allocation of the operating part 2 to the receiving part 3 is then carried out if the receiving part 3 in fact finds itself in the nonallocated condition and the message is an allocation message. Thus, command messages are ignored in the nonallocated condition. If this is so, the address of the allocated operating part 2 is stored in the receiving part 3 together with its selected identifier.

For safety reasons, the receiving part 3 in the nonallocated condition does not accept any control commands, and in the allocated condition it only accepts control commands from the allocated operating part 2. For this, commands emitted from the operating part 2 are sent along with the valid address feature, so that the receiving part 3 can verify the correctness of the commands.

For this, the received address feature and the one stored in the receiving unit, or only the address for the allocated operating part 2, are compared in the verification unit to make sure they match up.

Thus, a unique address need only be provided in the easily accessible operating part 2 and not also in the receiving part 3. Here, it is enough to provide an identifier for the receiving part 3, which is easily selected once and for all on the scene by the operator as a crane number, placed on the crane in a prominent location, entered during the allocation procedure via the operating part and transmitted to the receiving part.

In addition, the method of the one embodiment enables a simplification of the design of the operating part 2 and the receiving part 3, since now only one transmitting unit is necessary in the operating part 2 and one receiving unit in the receiving part 3. The receiving part 3 acknowledges the successful allocation of the operating part 2 with the signal unit 5, which puts out an acoustical signal.

So the "allocated" condition and a valid address of the allocated operating part 2 have now been stored. In this condition, control commands can be received and put out to the machine controller 4. However, only those control commands will be put out that have the stored address or were coupled with this during the transmission, i.e., that have been transmitted with a valid address feature.

An allocated receiving part can be controlled remotely and reset to the "not allocated" condition by the allocated operating part or by means on the receiving part itself, such as a reset key. Usually this is carried out by the operator with a corresponding procedure. The means on the receiving part itself are provided only for an emergency, i.e., loss or defect of the allocated operating part.

Figure 2:
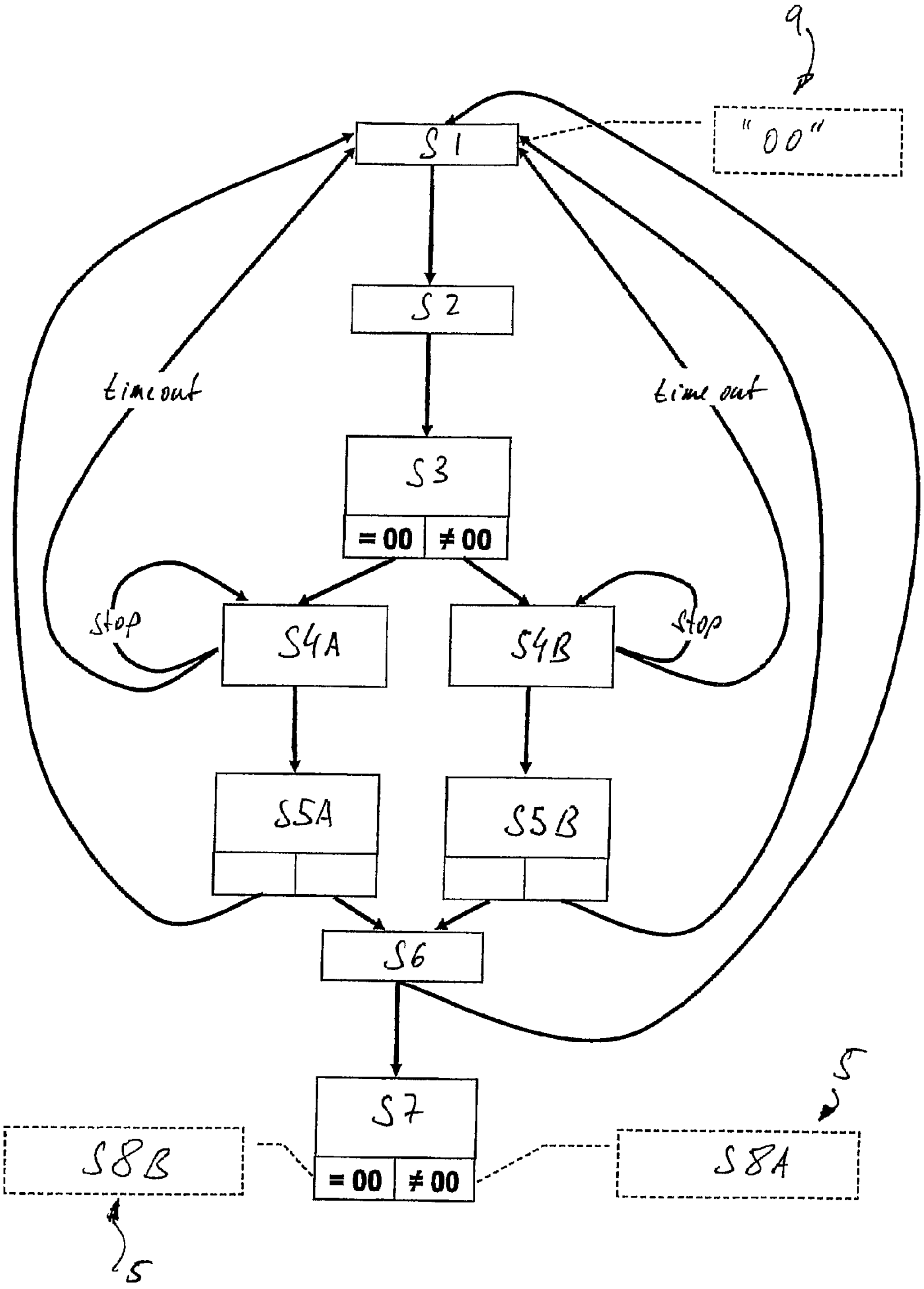
FIG. 2 is a schematic diagram of a sequence for allocating an operating part to a receiving part.

The method for allocating the operating part 2 to the receiving part 3 shall now be explained schematically by means of FIG. 2 for better comprehension.

After turning on an operating part 2 which has not yet been allocated, i.e., is in the not allocated condition, for example, by holding down the stop key for a long time, its display 9 appears as a crane number or identifier "00" (step S1). This indicates the not allocated condition of the operating part 2.

If the operating part 2 had been allocated to a receiving part 3, the display 9 would have indicated its identifier or crane number.

In order to allocate a non-allocated operating part 2 to a particular likewise non-allocated receiving part 3, one first switches by a predetermined keying sequence to the mode for changing the settings (step S2).

The display 9 now shows "0" and blinks.

The operator can now select the two-place identifier by incrementing or decrementing the displayed number, activating certain keys, such as "left" and "right" (step S3). After this, the selected identifier is confirmed by activating the signal key for the signal unit and it is continuously presented on the display (step S4A).

If the display on hand is only a single-place display, the method just described can be repeated accordingly for each place of the two-place crane number.

Finally, by activating the "lift" key, one exits the mode for changing of settings or allocation. If the identifier selected is in fact other than "00", further allocation is done, otherwise a termination occurs (step S5A). The selected identifier of the receiving part 3 is then stored in the operating part 2 (step S6).

Moreover, the selected identifier and the address of the operating part 2 are transmitted as a message in the form of a suitable signal 10 to the corresponding receiving part 3 (step S7).

This acknowledges the reception and the successful allocation by means of a twofold confirmation of the signal unit 5, i.e., for example, a twofold honking (step S8A), and stores the combination of unmistakeable address of the operating part 2 and selected identifier of the receiving part 3 as a valid address feature.

After this, both the operating part 2 and the hoisting gear of the receiving part 3 are in the stop mode. The display 9 now indicates the allocated identifier of the receiving part 3.

If the receiving part 3 was already allocated, there will be no new allocation, nor any confirmation by the signal unit 5.

The method just described can be broken off or exited at any time by activating the stop key or time sequence without entry (time out), which is indicated by corresponding arrows in FIG. 2.

The receiving part 3 can now be actuated by means of the allocated operating part 2 in order to accept control commands for the machine controller 4 or be reset for a new allocation.

To cancel the allocation of an operating part 2 and a receiving part 3, one proceeds as above, selecting "00" as the new identifier. After this, both the corresponding operating part 2 and the receiving part 3 are in the non-allocated condition. Steps S4B, S5B and S7 are thus run through accordingly, these differing from their "A" counterparts in that an allocation only takes place when the new identifier is "00".

To distinguish the successful resetting, a confirmation also takes place by the signal unit 5 in the form of a triple honking (step S8B).

The address used for an operating part is a multiple-place number, which is issued only once. Therefore, if the operating part is lost or becomes defective, a new operating part with a different address is used.

As the identifier for a receiving part, a two-place number between 01 and 99 may be used, in the most elementary case representing the crane number. A specially selected identifier indicates that a receiving part has not been allocated, such as, but not limited to, the identifier "00".

In addition, the method of the one embodiment allows for a simplified design of the operating part and the receiving part, since now only one transmitting unit in the operating part and one receiving unit in the receiving part are necessary.

In one embodiment, for safety reasons it is provided that the receiving part accepts allocation messages only if it has not been allocated. In this way, an unintentional allocation is difficult if not impossible. The receiving part recognizes that it is an allocation message from its structure, e.g., the header of the received message.

In addition, it can be provided that the receiving part does not accept any control commands when it has not been allocated. In this way, one can prevent the lifting gear from moving unintentionally.

Safety of the method is provided by the receiving part only allowing an allocation of an operating part when first placed in operation or in the reset condition, and it does not accept or pass on any control commands for the controller in this non-allocated condition.

Therefore, the receiving part in the allocated condition only accepts control commands from the allocated operating part if they have been transmitted along with a valid address feature. This occurs, e.g., in the form of a command message.

The operating part is set to the allocation mode in order to emit an allocation message. This mode is selected or turned on by a special, uncommon keying sequence, so that once again an unintentional allocation is difficult if not impossible.

The operating part stores the identifier of the allocated receiving part after the emitting of the allocation message. This enables the foregoing of a "handshake" protocol with the receiving part for a positive feedback message.

The receiving part is connected to the controller such that control commands are only passed on in the allocated mode and the power supply of the controller is also controlled by the receiving part. Thus, the controller can be switched, e.g., via a contact of the receiving part. An unintentional movement of the lifting gear is therefore not possible.

To further heighten the security, it can be provided that the receiving part has a signal unit for acknowledging the successful allocation of an operating part. The signal unit may put out an optical and/or acoustical signal.

In order to allow a new allocation when required, means can be provided for resetting the receiving part to the original nonallocated condition. This also enables a resetting if the allocated operating part which would normally be used for the resetting gets lost or becomes defective.

The system for wireless transmission of control commands consists of a mobile operating part with transmitting unit for the wireless transmission and a receiving part situated at a spatial distance from the latter for the receiving of the commands and the issuing of corresponding control signals to a controller of a lifting gear.

The operating part is outfitted with command units for the manual entry of control commands. It is supplied with electrical energy, such as from a battery or dry cell, and sends the control commands wirelessly, such as by radio or infrared signals.

The receiving part receives the wirelessly transmitted signals by means of a receiving unit, evaluates them selectively and determines from the transmitted address feature the allocation to an operating part. For this, the received address feature and the address feature stored in the receiving unit for the allocated operating part are compared to make sure they match up.

In order to allow the receiving part to operate with alternating operating parts without risks to safety, the receiving part can take on the conditions “allocated” or “not allocated” and change between these conditions.

In the “not allocated” condition, the receiving part has no valid address of an operating part or identifier stored in memory. In this condition, while wirelessly transmitted signals can be received and evaluated, no control commands can be put out. The receiving part has the “not allocated” condition before being put into service. This condition can only be changed by the allocation procedure with an operating part.

In the “allocated” condition, the receiving part has stored a valid address feature, i.e., a combination of the allocated operating part and its identifier. In this condition, control commands can be received and issued. However, only those control commands are issued or relayed to the controller that have the stored address feature or are coupled with it during the transmission, e.g., in the form of a command message.

An assigned or allocated receiving part can be reset to the “not allocated” condition by remote control with the allocated operating part or by means at the receiving part, e.g., a reset button.

The address of the operating part thus becomes a valid address feature for the transmission of control commands when it is amplified by or combined with at least one additional identifier, which is issued by the operator to distinguish the receiving parts or machines. The entering of the additional identifier is done during the allocation procedure, which can be carried out with the operating part.

Through the allocation procedure, the additional identifier is stored in the operating part and transmitted to a not yet allocated native receiving part, which stores the combination of imprinted address of the operating part and additional identifier as a valid address feature for the reception of control commands.

The receiving part so allocated can acknowledge the successful allocation with an optical or acoustical signal and thereafter has the “allocated” condition.

In order to carry out the allocation procedure, the operating part can be outfitted with a display, which can show the entered identifier, e.g., a two-place crane number, and can show messages to the operator during the rest of the operation.

Thus, in the method control commands for the controller are emitted wirelessly with the allocated operating part to the receiving part, and the control commands are coupled with the valid address feature consisting of the unmistakeable address of the operating part and the selected identifier of the receiving part in a command message.

A wireless transmission system for control commands for a controller of a lifting gear according to one embodiment is thus outfitted with a wireless operating part, which has an unmistakeable address and a transmitting unit, and with a receiving part, to which a selectable identifier is allocated and which has a receiving unit and is connected to the controller, in order to receive control commands coming from the operating part and pass them on to the connected controller, wherein the receiving unit is outfitted with a verification unit, which undertakes an allocation of the operating part to the receiving part by storing a combination of the address of the allocated operating part and the selected identifier as a valid address feature in the receiving part if the receiving part has not been allocated.

The verification unit may be a logic unit, which is programmed and/or switched to carry out the verification.

| List of reference symbols | |
|---|---|
| 1 | system |
| 2 | operating part |
| 3 | receiving part |
| 4 | machine controller |
| 5 | signal unit |
| 6 | drive unit |
| 7 | command unit |
| 8 | battery compartment |
| 9 | display |
| 10 | signal |

The invention claimed is:

1. A method of wireless communication between a wireless remote control and a receiving part of a machine controller for lifting gear wherein said remote control includes a unique address and said receiving part of the machine controller includes a selectable identifier, said method comprising:

setting up an address feature from the unique address of the remote control and the identifier of the receiving part of the machine controller;

transmitting an allocation message from said remote control to said receiving part, said allocation message including the address feature and information identifying the allocation message as an allocation message;

receiving the allocation message at the receiving part;

determining whether the receiving part is in an allocated state or a non-allocated state;

if the receiving part is in the allocated state, ignoring the allocation message; and if the receiving part is in the non-allocated state, setting the receiving part to an allocated state and storing the address feature at the receiving part whereby the receiving part thereafter controls the machine controller in response to control commands transmitted from the remote control that include the unique address and the identifier for the receiving part of the machine controller, and whereby the receiving part does not control the machine controller in response to control commands transmitted from a different remote control that includes an address different from the unique address.

2. The method of claim 1 further including switching the remote control to an allocation mode prior to transmitting the allocation message.

3. The method of claim 1 wherein the remote control stores the identifier of the receiving part after transmitting the allocation message.

4. The method of claim 1 wherein the receiving part acknowledges the successful allocation of the remote control by means of a signal unit.

5. The method of claim 4 wherein said signal unit emits one of a visual and audio signal in response to the successful allocation of the remote control.

6. The method of claim 1 further including switching said remote control to a command mode in order to transmit control commands from said remote control.

7. The method of claim 6 wherein said control commands include the unique address feature of the remote control and the identifier of the receiving part.

8. The method of claim 7 further wherein said receiving part verifies the unique address feature of the remote control in said control command prior to passing said control command onto said machine controller.

9. The method of claim 1 further including controlling the power supply of the machine controller via the receiving part.

10. The method of claim 1 further including resetting the receiving part to the non-allocated state.

11. A wireless communication system comprising:

a wireless remote control having a unique address, said remote control adapted to transmit allocation messages and control messages;

a receiving part of a machine controller of a lifting gear having a selectable identifier, said receiving part adapted to receive the allocation messages and control messages from the remote control, said receiving part capable of assuming an allocated and a non-allocated state;

wherein said allocation messages include an address feature being a combination of said unique address and said identifier, and information identifying said allocation messages as allocation messages;

wherein said receiving part being in a non-allocated state switches from the non-allocated state to the allocated state upon receipt of the allocation message by saving the address feature;

wherein said receiving part being in the allocated state passes said control message onto said machine controller upon receipt of the control message;

wherein said receiving part withholds passing other control messages onto said machine controller if said other control messages include an identifier corresponding to a different receiving part; and wherein said receiving part withholds passing other control messages onto said machine controller if said other control messages include a unique address corresponding to a different remote control.

12. The system of claim 11 wherein said receiving part ignores said allocation message if said receiving part is in the allocated state.

13. The system of claim 12 wherein said receiving part ignores other allocation messages if said other allocation messages include a unique address corresponding to a different remote control.

14. The system of claim 13 wherein said receiving part ignores other allocation messages if said other allocation messages include an identifier corresponding to a different receiving part.

15. The system of claim 11 wherein said receiving part is adapted to store said unique address.

16. The system of claim 11 further including a signal unit adapted to acknowledges the successful allocation of the remote control by one of a visual and audio signal.

17. The system of claim 11 wherein said receiving part is further adapted to control a power supply to said machine controller.

18. The system of claim 11 wherein said receiving part is further adapted to be reset to the non-allocated state.

* * * * *

UNITED STATES PATENT AND TRADEMARK OFFICE

CERTIFICATE OF CORRECTION

PATENT NO. : 8,350,672 B2
APPLICATION NO. : 12/281695
DATED : January 8, 2013
INVENTOR(S) : Anton Munzebrock It is certified that error appears in the above-identified patent and that said Letters Patent is hereby corrected as shown below:

Column 4
Line 8, insert --"99".-- after "and"

Column 8
Line 60, Claim 7, delete "unique" before "address"
Line 63, Claim 8, delete "unique" before "address"

Signed and Sealed this
Twelfth Day of March, 2013

Teresa Stanek Rea
*Acting Director of the United States Patent and Trademark Office*